United States Patent [19]
Abefelt et al.

[11] Patent Number: 5,327,422
[45] Date of Patent: Jul. 5, 1994

[54] CONTROLLABLE MULTIPLEXER FOR A DIGITAL SWITCH

[75] Inventors: Erik O. Abefelt, Vällingby; Karl A. Bjenne, Huddinge; Carl P. B. Lundh, Farsta, all of Sweden

[73] Assignee: Telefonaktiebolaget L M Ericsson, Stockholm, Sweden

[21] Appl. No.: 990,506

[22] Filed: Dec. 15, 1992

[30] Foreign Application Priority Data

Dec. 16, 1991 [SE] Sweden ............................. 9103715-0

[51] Int. Cl.$^5$ ........................................... H04Q 11/04
[52] U.S. Cl. ................................... 370/63; 370/100.1; 370/105.1; 370/105.2; 370/112
[58] Field of Search ................... 370/59, 100.1, 105.1, 370/105.2, 112, 63

[56] References Cited

U.S. PATENT DOCUMENTS

| | | | |
|---|---|---|---|
| 4,612,636 | 9/1986 | Grover et al. | 370/94 |
| 4,809,166 | 2/1989 | Cooper | 364/200 |
| 4,855,999 | 8/1989 | Chao | 370/112 |
| 4,858,224 | 8/1989 | Nakano et al. | 370/16 |
| 4,910,731 | 3/1990 | Sakurai et al. | 370/67 |
| 4,939,723 | 7/1990 | Harley, Jr. et al. | 370/84 |
| 5,029,160 | 7/1991 | Homma | 370/112 X |
| 5,046,000 | 9/1991 | Hsu | 364/200 |
| 5,058,104 | 10/1991 | Yonehara et al. | 370/112 X |
| 5,191,578 | 3/1993 | Lee | 370/63 |

FOREIGN PATENT DOCUMENTS

| | | | |
|---|---|---|---|
| 0169551 | 12/1988 | European Pat. Off. | H04Q 3/545 |
| 84-00836 | 3/1984 | PCT Int'l Appl. | G06F 13/00 |
| 9103719-2 | 8/1993 | Sweden | H04J 3/16 |
| 2200817 | 8/1988 | United Kingdom | H04J 3/07 |

*Primary Examiner*—Douglas W. Olms
*Assistant Examiner*—Russell Blum
*Attorney, Agent, or Firm*—Burns, Doane, Swecker & Mathis

[57] ABSTRACT

The invention relates to a multiplexer for a digital switch, arranged to be included in a switch network whose data flow is organized in frames containing a number of time slots, said time slots including data time slots, which shall be directed through the switch from first to second sets of terminal units, such as subscriber connections, trunk connections, processors, etc. The multiplexer is controlled by a processor for controllable multiplexing, i.e., mapping of a number of transmission links from each of a corresponding number of the terminal units of said first set to a transmission link leading to the switch, as well as of a transmission link leading from the switch to a number of transmission links leading to each of a corresponding number of terminal units of said second set. The mapping is performed on the data time slots. All data time slots arriving from the terminal units of said first set are to be sent forward via a first buffer to the switch in an order which is determined by a first control memory for the mapping, and all data time slots arriving from the switch are to be sent forward via a second buffer toward the terminal units of said second set in an order which is determined by a second control memory for the mapping. The buffers are implemented as fifos, one for each of the links from and to the terminal units.

3 Claims, 4 Drawing Sheets

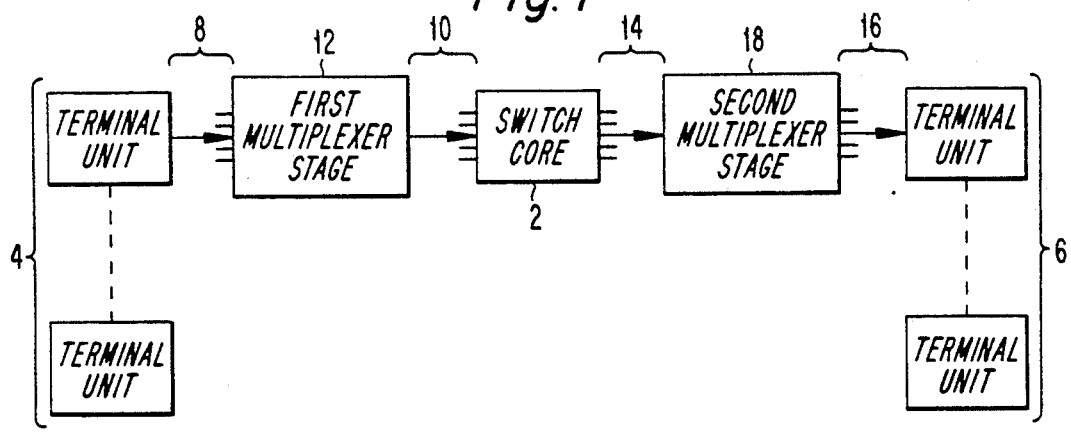
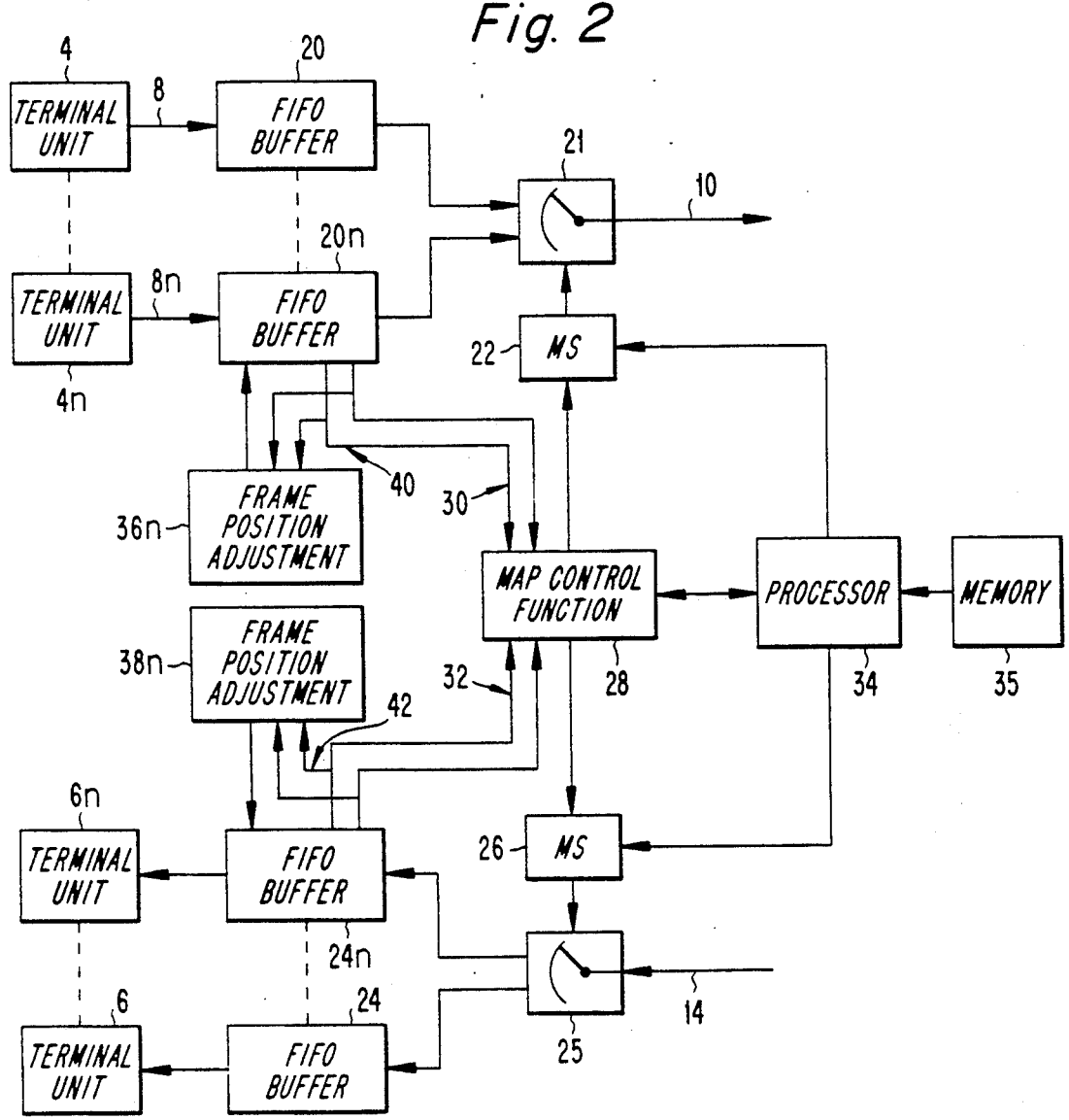

CONTROLLABLE MULTIPLEXER FOR A DIGITAL SWITCH

TECHNICAL BACKGROUND.

The present invention relates to a multiplexer for a digital switch, which is arranged to be included in a switch network, the data flow of which is organized into frames containing a number of time slots including data time slots, which shall be connected through the switch from first to second sets of terminal units, such as subscriber connections, trunk connections, processors, etc., wherein the multiplexer is controlled by a processor for controllable multiplexing, i.e. mapping, of a number of transmission links from each of a corresponding number of the terminal unit of said first set to a transmission link leading to the switch, as well as of a transmission link leading from the switch to a number of transmission links to each of a corresponding number of terminal units of said second set, said mapping being performed on the data time slots, wherein all data time slots arriving from the terminal units of said first set are to be sent via first buffer means to the switch in an order determined by a first mapping control memory, and all data time slots arriving from the switch are to be sent via second buffer means toward the terminal units of said second set in an order which is determined by a second mapping control memory.

More particularly, the switch can be a time-space switch of a kind described in more detail in Swedish patent application 9103719-2. Therein it is additionally disclosed that on the transmission links there also occur, besides the data time slots, control time slots containing packet data for controlling the switch.

When several transmission links are mapped together it is important that this occurs with little delay, and that time slot integrity is retained, that is, the time slots arrive in a correct order. A certain delay is required, however, to avoid risking that data is read before having been written, since time slot integrity is then lost.

Therefore, it is important that time slot integrity can easily be checked, which is difficult if the buffers required for the mapping function are realized with usual memories.

STATE OF THE ART

WO 84/00836, U.S. Pat. No. 4,612,636, U.S. Pat. No. 4,809,166, and EP 0169551 describe the general state of the art without stating anything which can be considered to anticipate the present invention as it is described below.

STATEMENT OF THE INVENTION

The object of the invention is to solve the above mentioned problem which, in a multiplexer of the kind defined by way of introduction, has been achieved according to the invention by implementing said buffer means as fifos, one fifo for each of said links leading from or to the terminal units.

Preferably, said fifos are implemented to be able to produce indications for "fifo full" and "fifo empty", meaning that the mapping is not carried through correctly, a map control function being implemented and connected for making changes in the contents of the control memories at the appearance of such indications.

Advantageously, a frame position adjustment means can be provided to execute frame position adjustment locally within the multiplexer based upon said indications so as to obtain smallest possible read out delay from the fifos.

DESCRIPTION OF DRAWINGS

The invention shall now be described in more detail below with reference to the embodiment shown on the attached drawings.

On the drawings

FIG. 1 is a block diagram showing principles of a digital time-space switch and its connections, FIG. 2 is a schematic block diagram of a programmable multiplexer according to the invention, with appurtenant processor.

PREFERRED EMBODIMENT

Figure 3:
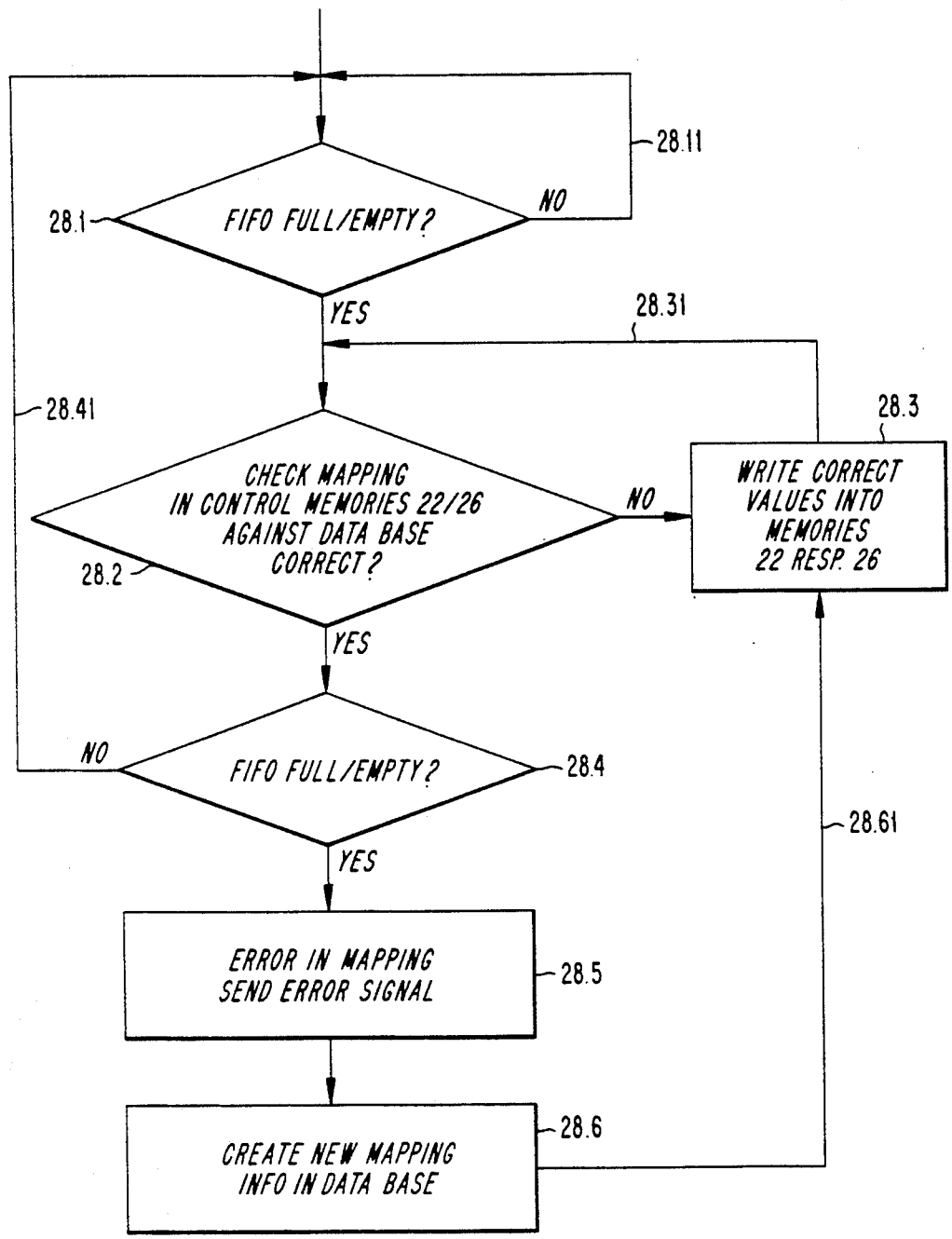
FIG. 3 is a flowchart illustrating the way of operation of a map control function for the mapping included in the multiplexer according to FIG. 2.

Referring to FIG. 1, a digital time-space switch contains a switch core 2, and is provided to be included in a switch network, not shown, the data flow of which being organized into frames containing a number of time slots, including i.a. data time slots.

The data time slots contain data to be switched through the switch from first to the second sets 4 and 6, respectively, of terminal units, such as subscriber lines, trunk lines, processors, etc. One, several, or all of the terminal units 4 can be specifically related to a corresponding one of the terminal units 6, in particular be physically located at the same place, for example on the same circuit board. A terminal unit 4 and a terminal unit 6 can thus e.g. form input and output, respectively, of an apparatus (for example telephone set). The term "terminal unit" will also be used henceforth.

A controllable multiplexer is arranged for controllable multiplexing, mapping, of a number of transmission links 8 from each of a corresponding number of the terminal units of the first set 4 to a transmission link 10 leading to the switch core 2, by means of a first multiplexer stage 12. In a similar way the multiplexer is arranged for mapping a transmission link 14 leading from the switch core 2 to a number of transmission links 16 each leading to a corresponding terminal unit of the second set 6, by means of a second multiplexer stage 18.

More particularly, the mapping is performed on the data time slots. Referring to FIG. 2 all data time slots arriving from the terminal units of the first set 4 are to be sent further via first buffer means 20 and a mux 21 toward the switch core 2 in an order specified by a first mapping control memory 22 which controls the mux 21. All data time slots which arrive from the switch core 2 shall be sent further via second buffer means 24 and a mux 25 toward the terminal units of the second set 6 in an order specified by a second mapping control memory 26 which controls the mux 25.

In accordance with one of the characterizing features of the invention the buffer means 20 and 24 consist of fifos, one for each of the links 8 and 16, respectively. This is indicated in FIG. 2 by a link designated 8n from a terminal unit 4n being received by a fifo 20n, and by a link designated 16n leading to a terminal unit 6n from a fifo 24n. A more detailed discussion below of one aspect of the way of operation of the controllable multiplexer is based on the above indicated relationship between the two terminal units 4n and 6n.

In a way known per se the fifos 20 and 24 are implemented to be able to produce indications for "fifo full" and "fifo empty". These indications mean in the present case that the mapping is not carried through correctly, and are received, according to another one of the features of the invention, by a map control function 28, this being shown by arrows 30 for the fifo 20n and arrows 32 for the fifo 24n. The map control function 28 is implemented and connected for carrying out changes in the control memories 22 and 26 at the appearance of such indications.

For controlling the multiplexer a processor 34 is provided, which has access to a data base 35 containing information regarding the way of operation of the multiplexer. The processor 34 orders changes in the control memories 22 and 26.

The way of operation of the map control function 28 appears from the flowchart in FIG. 3. In a first step 28.1 the state of a current fifo 20 or 24 is investigated. If no indication for fifo full or fifo empty is obtained according to the above, the process is restarted according to arrow 28.11. If, on the other hand, such an indication occurs, a test is made in step 28.2 with respect to the correctness of the mapping information in the control memory 22 or 26, respectively, by comparison with the mapping information of the data base 35. If this is not the case, correct values for the mapping information are written in step 28.3 by the processor 34 via the map control function 28 into the control memories 22 and 26, respectively.

According to arrow 28.31 and step 28.2 a new investigation of the mapping information of the control memory is thereafter made. If it is now correct a new test is also done on the state of the current fifo in step 28.4. If no indication "fifo full" or "fifo empty" is now obtained the process starts again from the beginning as indicated by arrow 28.41.

If such an indication on the other hand remains it is a sign of the mapping information of the data base 35 being erroneous, and an error signal is sent to the part of the system which has responsibility for the mapping information, for further measures in step 28.5. After this action new mapping information is written into the data base 35 in step 28.6. The process thereafter according to arrow 28.61 returns to step 28.3 with accompanying renewed test of the mapping information according to steps 28.2 and 28.4.

In an embodiment of the map control function 28 presently preferred, said map control function is implemented by a processor with appurtenant software which forms a state machine according to FIG. 3. The concept state machine is well known to the man of the art, who also understands how to realize the functions according to FIG. 3 by means of a suitable logic combination of gates and clocked flip-flops included in the machine. A more detailed description is therefore not required here.

Preferably the indications "fifo full" and "fifo empty" are also used by frame position adjustment functions 36 and 38 likewise controlled by the processor as indicated with arrows 40 and 42, respectively. More particularly, the frame position adjustment functions 36 and 38 are arranged and implemented to perform frame position adjustment locally within the multiplexer so as to obtain smallest possible readout delay from fifos 20 and 24, respectively. There can be a common frame position adjustment function 36 for all fifos 20, and a common frame position adjustment function 38 for all fifos 24, or also every fifo can have its own. The latter alternative is indicated in FIG. 2 by the frame position adjustment function for the fifo 20n having been designated 36n, and that for the fifo 24n having been designated 38n.

Figure 4A:
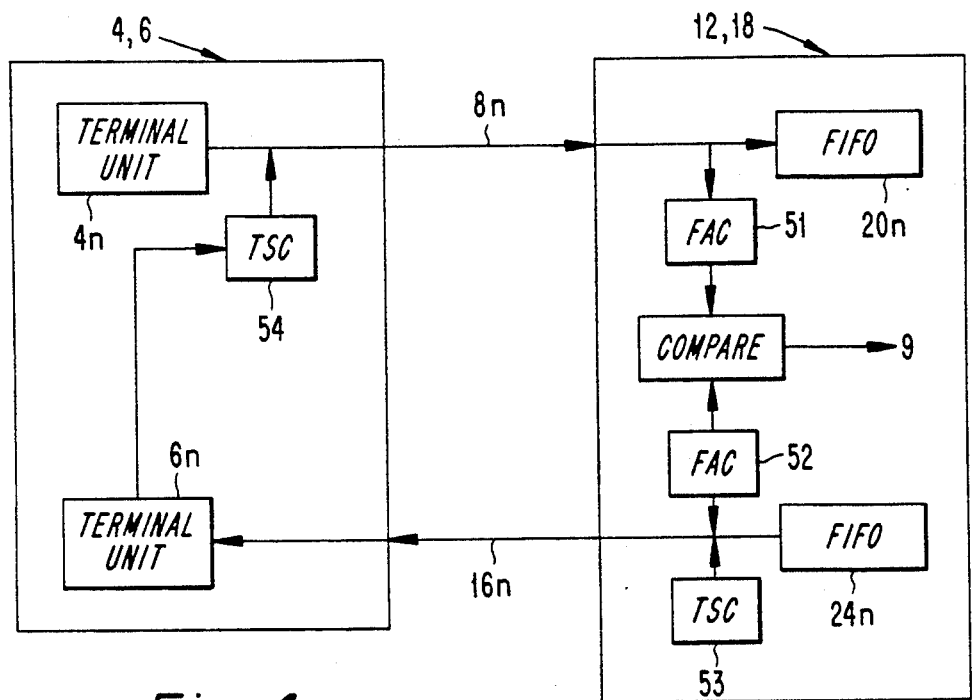
FIG. 4a shows a somewhat more detailed section of FIG. 2

In order for a receiver of a link to be able to control the frame position there is a time slot in the frame for frame position adjustment, henceforth and in FIG. 4a also called FAC=Frame Alignment Control. Every fifo has, besides a time slot counter, a register keeping such a time slot. This time slot is used to transmit frame phasing information over a link, for example from switch core to multiplexer, from multiplexer to multiplexer or from multiplexer to terminal units. The function of being able to affect frame position is needed for several reasons. In the multiplexer the function is necessary in order to obtain a shift between frames coming in and going out. This is needed for the mapping function.

A description follows below of how to effect frame position adjustment on the various interconnections to and from the multiplexer. Since the frame positions on the various links depend on each other, the order is important.

Frame position for outgoing link 16 to terminal units 6 is set so that mapping can occur between the switch core and the terminal units. The shift between frames from the switch core and frames towards terminal units can be made sufficient, calculated for the current mapping, or automatically adjusted.

The description below is for application of automatic adjustment.

FIG. 4a illustrates the situation for frame position adjustment between multiplexer and terminal units 4n, 6n in more detail. In association with fifo 20n a FAC register 51 of the kind mentioned above is shown. In the same way there is shown in association with the fifo 24n a FAC register 52, as well as a time slot counter 53 counting time slots in frames toward terminal units. At the terminal unit 4n a time slot counter 54 is indicated, which counts time slots in frames directed to the multiplexer. The parameter controlling the frame position between terminal units and multiplexer is the shift necessary for mapping between terminal units 4,6 and switch core 2.

Frame position adjustment will now be explained more closely below with reference to FIGS. 4a, 4b and 5.

For frame position adjustment between the terminal units 4n and the multiplexer stage 12 the multiplexer calculates a FAC value (the register 52) and sends this on the link 16n to the terminal units 4n, 6n. The terminal unit changes position of the frames directed to the multiplexer, that is, the time relationship between frame start for the frame carrying on the link 16n data to the terminal unit, and frame start of the frame carrying on the link 8n data from the terminal unit. When the terminal unit has changed position of the frames directed to the multiplexer this is confirmed by the FAC time-slot of this frame taking the same value as the FAC time-slot of the frame directed from the multiplexer to the terminal unit.

Figure 4B:
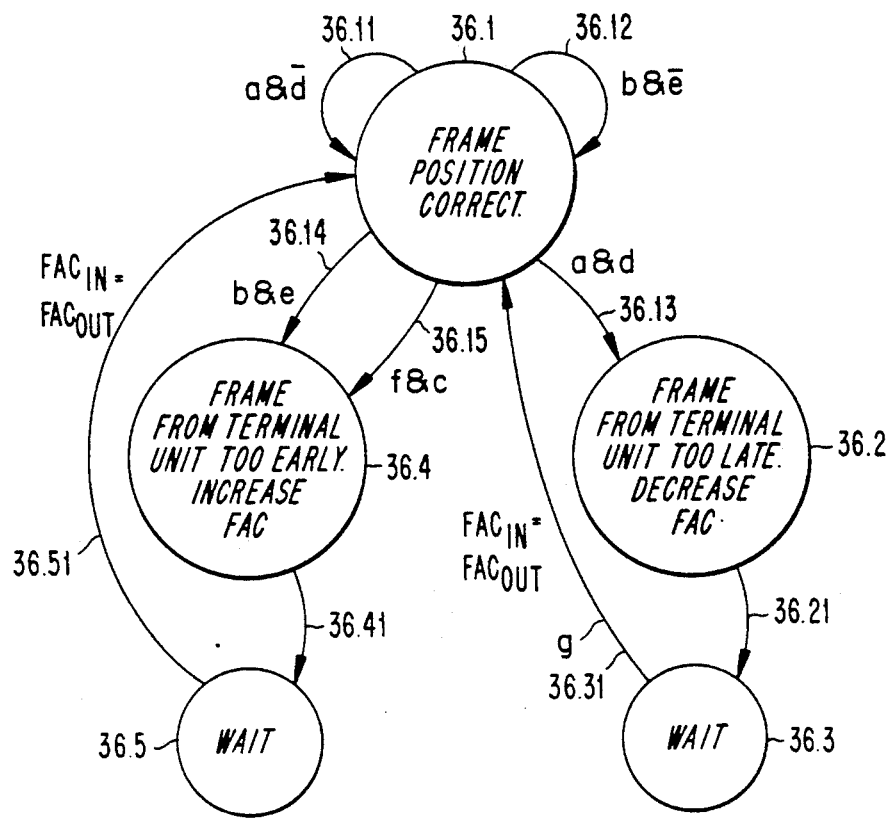
FIGS. 4b and 5 are state diagrams illustrating frame position adjustment in the direction terminal unit to switch core, and in the direction switch core to terminal unit, in the multiplexer according to FIG. 2.

FIG. 4b shows a state diagram for frame position adjustment in the direction from terminal unit to switch core. The frame position adjustment function 36n works with the following signals:

Input signals:

a from mux 21 based on contents of the memory 22=read out fifo 20n to the switch core, b from link 8n based on the arrival of a data time-slot on the link=write into fifo 20n from terminal unit 4n, c from link 10 based on frame start on this link=-frame sync on link to switch core, d from fifo 20n=fifo empty e from fifo 20n=fifo full f from flip-flop that stores whether fifo 20n has been empty some time during the frame, g=the result of comparison between FAC from register 52 directed to terminal units 4n, 6n and confirmed FAC in register 51 directed from terminal unit.

Output signal:

h=FAC value sent from register 52 to terminal unit.

In FIG. 4b the state 36.1 signifies that the frame from the terminal unit 4n arrives at the right instant in fifo 20n. According to state change arrows 36.11 and 36.12 the result of simultaneous appearance of signals a and $\bar{d}$, that is fifo 20n not empty, and signals b and $\bar{e}$, that is fifo not full, does not result in any state change.

Simultaneous appearance of signals a and d result in a change to state 36.2 according to arrow 36.13. This state is distinguished by the frame from terminal unit 4n arriving too late in fifo 20n. The action taken is to reduce FAC. This is effected by reducing the FAC value sent from register 52 to terminal unit 6n. Now g is waited for. This is indicated by arrow 36.21, state 36.3 and arrow 36.31, and has the result that state 36.1 is reached.

Simultaneous appearance of either the signals b and e or the signals f and c implies a change according to arrow 36.14 or arrow 36.15, respectively, to state 36.4. This state is distinguished by the frame from the terminal unit 4n arriving too early in fifo 20n. The action needed is to increase the FAC. This is effected by increasing the FAC value sent on the link 16n to terminal unit 6n. Now g is waited for. This is indicated by means of arrow 36.41, state 36.5 and arrow 36.51, and has the result that state 36.1 is reached.

Figure 5:
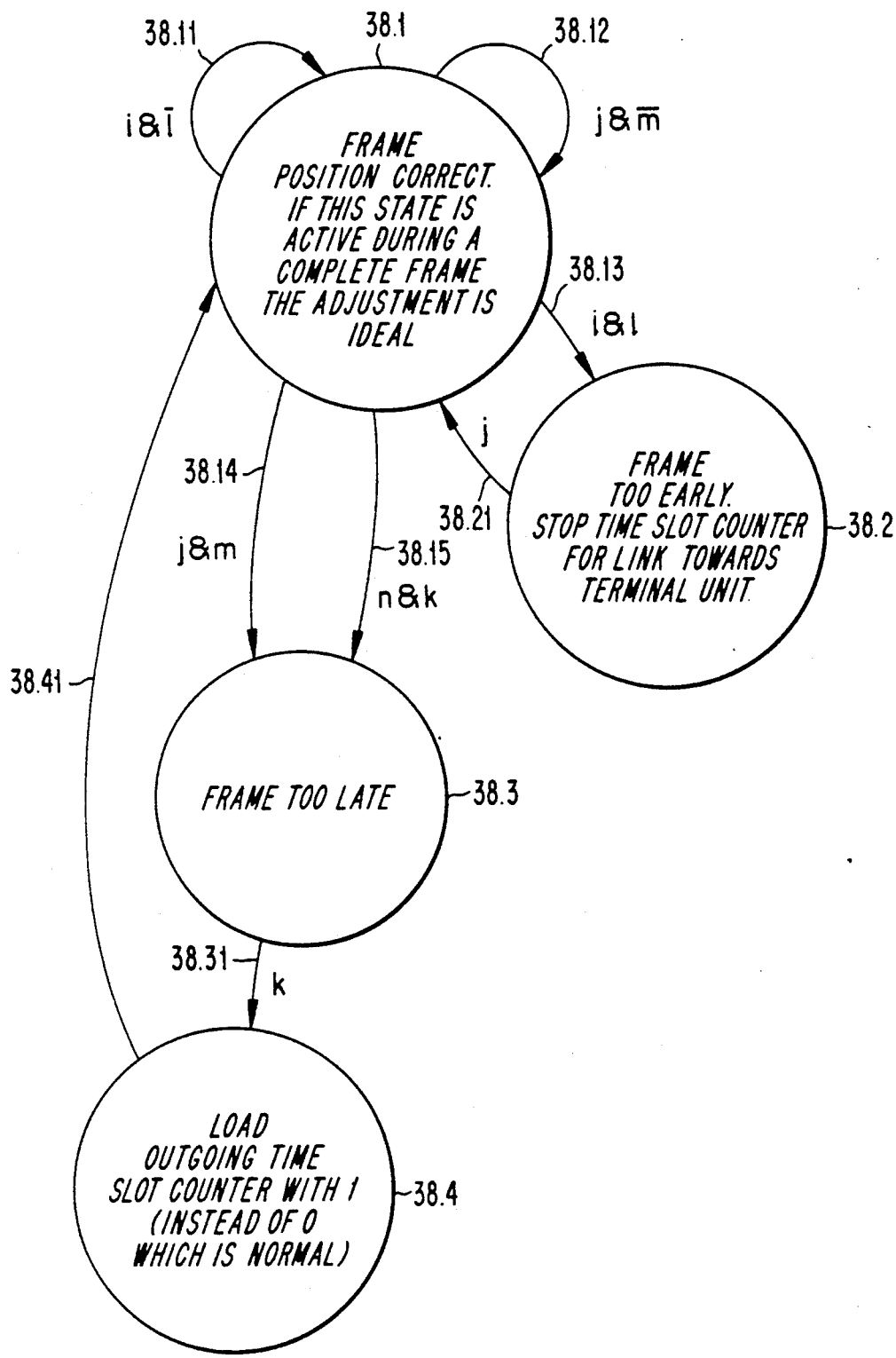

FIG. 5 shows a state diagram for frame position adjustment in the direction from switch core to link. The frame position adjustment function 38n works with the following input signals:

i from link 16n based on a data time slot being sent to terminal unit 6n=readout fifo 24n to terminal unit 6n, j from mux 25 based on a data time slot arriving on link 14=write into fifo 24n from switch core, k from link 16n due to a frame sync being sent on link to terminal unit 6n=frame sync on link to terminal unit 6n, l from fifo 24n=fifo empty m from fifo 24n=fifo full n from flip-flop which stores whether the fifo has been empty some time during the frame=fifo not empty during entire frame.

In FIG. 5 state 38.1 indicates that the frame directed to the terminal unit 6n leaves fifo 24n at the right instant, If this state is active during an entire frame the control is ideal. According to state change arrows 38.11 and 38.12 simultaneous appearance of the signals i and $\bar{l}$, that is fifo 24n not empty, and the signals j and m, that is fifo not full, results in no state change.

Simultaneous appearance of the signals i and 1 implies a change to state 38.2 according to arrow 38.13. This state is distinguished by the frame directed to the terminal unit 6n leaving the fifo 24n too early. The action taken is to stop the time slot counter 53 for link 16n to terminal unit 6n, resulting in the frame being sent a time slot later to terminal unit 6n, and according to arrow 38.21 return to state 38.1 upon signal j, that is, when writing into the fifo 24n from the switch core occurs.

Simultaneous appearance of either the signals j and m, or the signals n and k implies according to arrows 38.14 or 38.15, respectively, a change to state 38.3. This state is distinguished by the fifo 24n being unnecessarily full, and frames directed to the terminal unit 6n leaving the fifo 24n to late. When the frame synchronization signal is sent to terminal unit 6n, a change to state 38.4 occurs according to arrow 38.31, and loading the timeslot counter 53 for the link 16n with 1 instead of 0. This shortens the current frame by one time slot by virtue of the fact that one time slot fewer will be sent to the terminal unit 6 before the next frame sync occurs. Arrow 38.41 indicates that the measure in state 38.4 lead back to state 38.1 without any special conditions.

In one embodiment of the control arrangements 36 and 38, presently preferred, these are implemented as state machines. Such a state machine is a well known concept for the man of the art, who also knows how to realize the functions according to FIG. 4 and 5 by means of a suitable logical combination of gates and clocked flip-flops included in the machine. A more detailed description is therefore not required here.

Further, it should be added that the control information of the switch is sent the same way as the data which is switched through the switch. More detailed information about this as well as the way of operation and implementation of such switch and the multiplexer can be obtained from simultaneously filed Swedish patent application 9103719-2.

We claim:

1. A multiplexer for a digital switch, the multiplexer controlling data flow organized into frames and time slots, the data flow being directed from a first set of terminal units to a second set of terminal units, comprising:

a first multiplexer stage controlled by a first control memory, the first multiplexer stage being coupled between the first terminal units and the digital switch via a plurality of transmission links and having a first FIFO buffer means for forwarding the time slots from the first terminal units to the switch in an order determined by the first control memory;

a second multiplexer stage, controlled by a second control memory, the second multiplexer stage being coupled between said second terminal units and the digital switch via a plurality of transmission links and having a second FIFO buffer means for forwarding the time slots from the switch to the second terminal units in an order determined by the second control memory, wherein the first FIFO buffer means and the second FIFO buffer means provide indications whether the first FIFO buffer means and the second FIFO buffer means are empty or full, and a map control function is implemented when the empty or full indications are present in order to provide mapping information; and a processor for controlling the first control memory and the second control memory; wherein the processor includes a memory which is used to check the mapping information in the first control memory and the second control memory, and the map control function is implemented when there is a disagreement between the memory and the first control memory or the second control memory.

2. A multiplexer for a digital switch, the multiplexer controlling data flow organized into frames and time slots, the data flow being directed from a first set of terminal units to a second set of terminal units, comprising:

a first multiplexer stage controlled by a first control memory, the first multiplexer stage being coupled between the first terminal units and the digital switch via a plurality of transmission links and having a first FIFO buffer means for forwarding the time slots from the first terminal units to the switch in an order determined by the first control memory;

a second multiplexer stage, controlled by a second control memory, the second multiplexer stage being coupled between said second terminal units and the digital switch via a plurality of transmission links and having a second FIFO buffer means for forwarding the time slots from the switch to the second terminal units in an order determined by the second control memory, wherein the first FIFO buffer means and the second FIFO buffer means provide indications whether the first FIFO buffer means and the second FIFO buffer means are empty or full, and a map control function is implemented when the empty or full indications are present in order to provide mapping information; and a processor for controlling the first control memory and the second control memory;

wherein a frame adjustment function performs frame position adjustment in order to achieve the least delay of data flow through the multiplexer.

3. A multiplexer according to claim 1 wherein a frame adjustment function performs frame position adjustment in order to achieve the least delay of data flow through the multiplexer.

* * * * *